June 9, 1953  H. T. BOOTH  2,641,277
FLUID SYSTEM DAMAGE CONTROL
Filed Aug. 27, 1945  5 Sheets-Sheet 1

INVENTOR
HARRY T. BOOTH.
BY
ATTORNEY

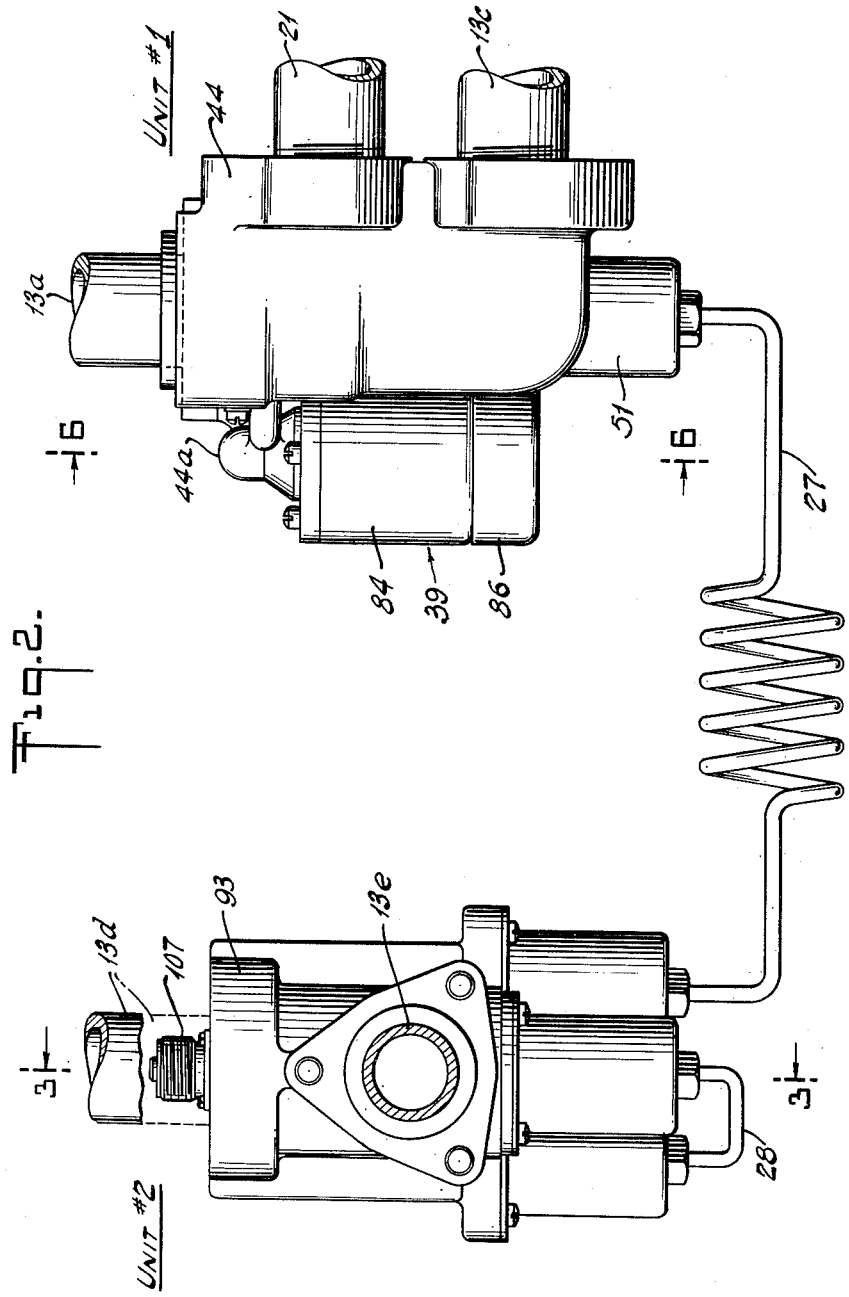

June 9, 1953 H. T. BOOTH 2,641,277
FLUID SYSTEM DAMAGE CONTROL
Filed Aug. 27, 1945 5 Sheets-Sheet 3
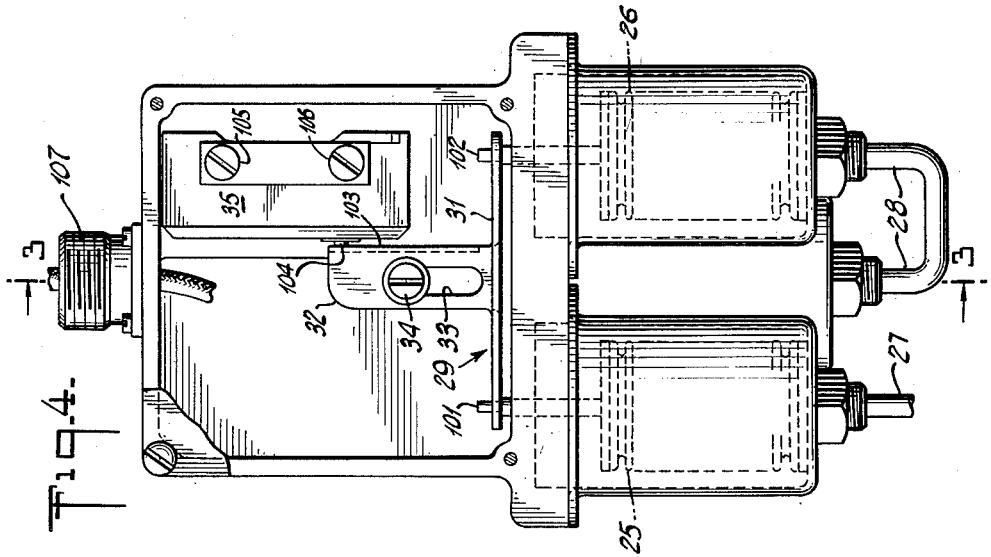
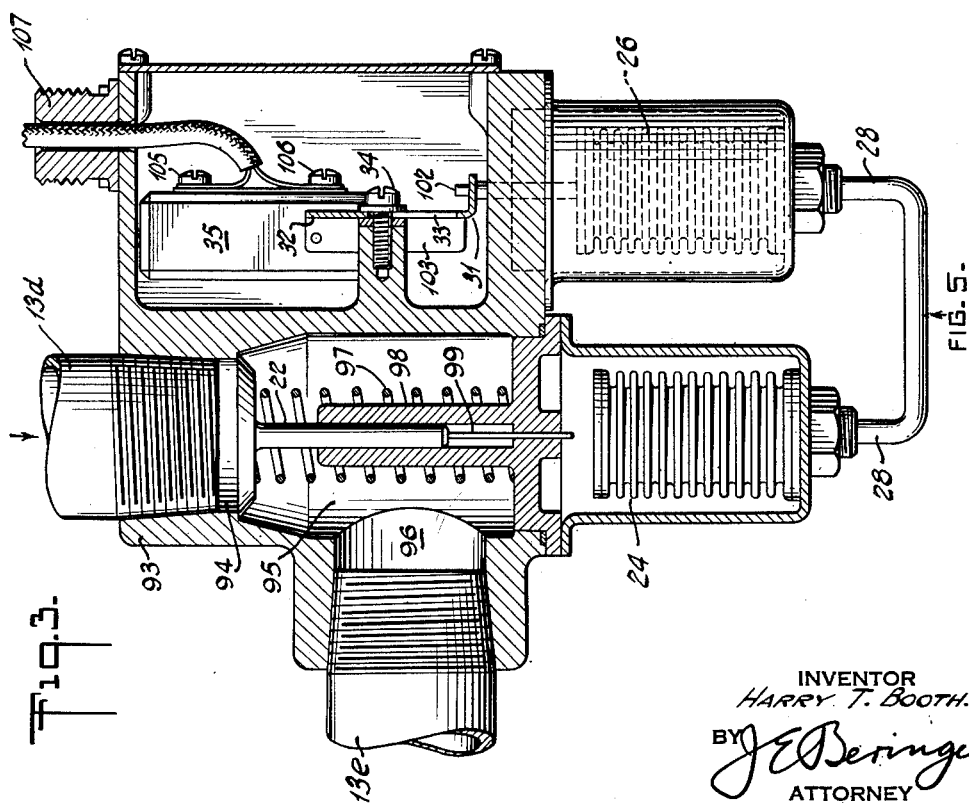
INVENTOR
HARRY T. BOOTH.
BY J E Beringer
ATTORNEY June 9, 1953  H. T. BOOTH  2,641,277
FLUID SYSTEM DAMAGE CONTROL
Filed Aug. 27, 1945  5 Sheets-Sheet 4

INVENTOR
HARRY T. BOOTH.
BY J E Beringer
ATTORNEY

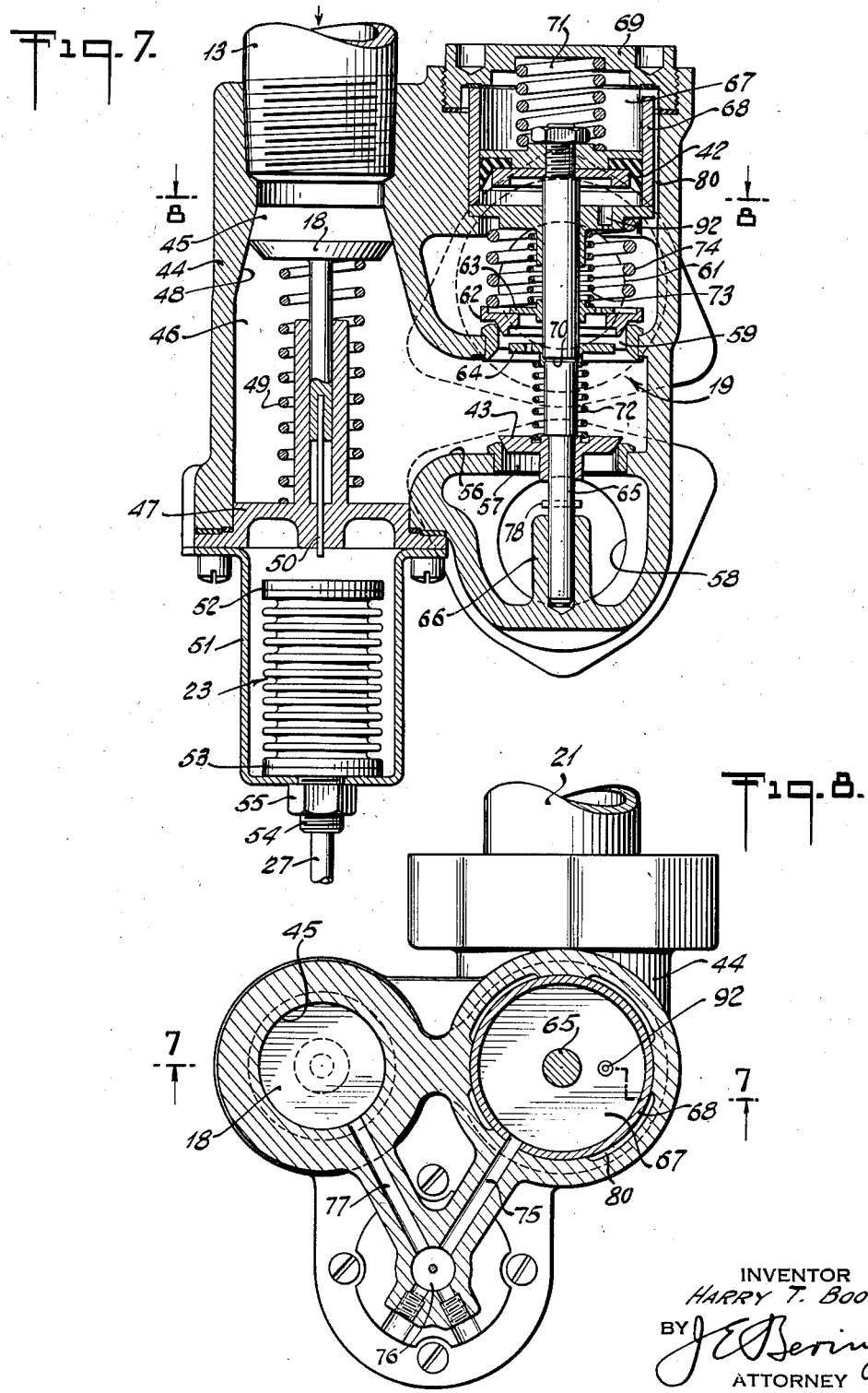

Patented June 9, 1953

2,641,277

UNITED STATES PATENT OFFICE 2,641,277

FLUID SYSTEM DAMAGE CONTROL

Harry T. Booth, Dayton, Ohio, assignor to United Aircraft Products, Inc., Dayton, Ohio, a corporation of Ohio Application August 27, 1945, Serial No. 612,907

15 Claims. (Cl. 137—460)

This invention relates to apparatus for preventing or limiting fluid loss from a fluid flowing system when damage or failure in the system develops a point of leakage.

Although not so limited, the invention has special application to the engine lubrication systems of combat aircraft and tanks. In such vehicles lubrication of the engine is accomplished by force fed oil, which is withdrawn from a relatively remote reservoir and conveyed by way of interconnecting conduits to the engine and back to the reservoir. The interconnecting lines, and particularly the oil temperature regulator customarily disposed in the return conduit, are vulnerable to damage by gun and shell fire and may develop leaks resulting in loss of oil and engine failure due to lack of lubrication.

Fluid loss protection means is contemplated by the present invention, whereby a leak in a fluid conduit, such as an oil line of an engine lubrication system, may be detected and flow to that conduit shut off. In the case of a lubrication system, closing off of the damaged conduit is accompanied by opening of a by-pass in order that the flow of lubricant may be uninterrupted.

Accordingly, a specific object of the invention is to prevent engine failure in combat vehicles due to loss of oil from a damaged lubrication system.

More generally, an object of the invention is to define in a fluid flowing system a protected area to which fluid flow automatically is discontinued should a leak develop in such area.

Another object is to arrange flow responsive devices in series in a fluid flowing conduit and to place under the control of these devices apparatus for diverting fluid flow from the conduit, automatically operative in response to an unequal action of the flow responsive devices indicating the rate of flow past one device to be less than that past a device upstream thereof.

In carrying out the objects of the invention, apparatus has been devised illustrating a concrete embodiment of the invention and comprising a pair of poppet valves arranged in series in a fluid conduit to define a protected area therebetween, the poppet valves having fluid flow responsive deflections which are equal for conditions of equal flow and which become unequal when the flow past the second poppet valve becomes less than the flow past the first, and the apparatus further comprising a valve for diverting the fluid from passage through the fluid conduit, and control means responding to an unequal deflection of the poppet valves to initiate actuation of the valve.

Other objects and structural details of the invention will appear from the following description when read in connection with the accompanying drawings, wherein:

Fig. 2 is a detailed view in side elevation of interconnected units in which the elements of the fluid flow protection apparatus are embodied;

Fig. 3 is a view of unit No. 2 in vertical longitudinal section, taken substantially along the line 3—3 of Fig. 2;

Fig. 4 is a view of unit 2 in front elevation, a cover plate being partly broken away;

Fig. 7 is a view in vertical longitudinal section of unit No. 1 taken substantially along the line 7—7 of Fig. 8; and Fig. 8 is a view of unit 1 in cross section, taken substantially along the line 8—8 of Fig. 7.

Figure 1:
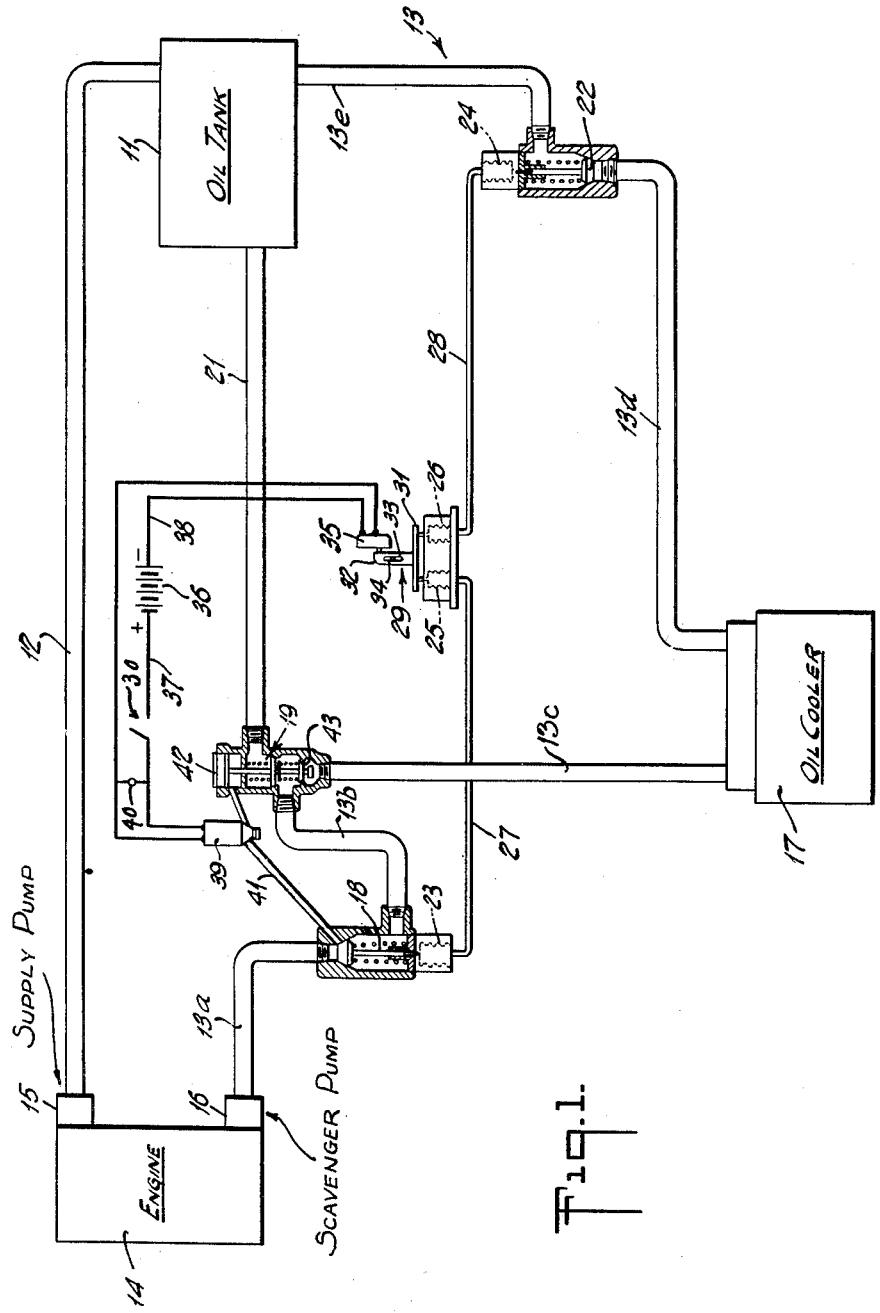
Fig. 1 is a diagram, illustrating the invention as embodied in an aircraft engine lubrication system.

Referring to Fig. 1, an aircraft engine lubrication system comprises an oil reservoir 11 from which extend supply and return conduits 12 and 13 respectively. The opposite ends of the conduits 12 and 13 terminate at the engine 14. Engine driven pumps 15 and 16 are disposed in respective lines 12 and 13 adjacent the engine 14 and enforce a continuous circulation of lubricant through the system. Accordingly, oil taken from the reservoir 11 by way of conduit 12 is forced by pump 15 into the engine bearings and centers of lubrication. The oil draining from the engine collects in a sump or the like from which it is withdrawn by pump 16 and returned by way of conduit 13 to the reservoir 11 for re-use.

The oil return line 13 is sectional in form, there being interposed therein an oil temperature regulator 17 and devices comprising the fluid loss protecting means of the present invention. So considered, the line 13 may be described as made up of several portions 13a, 13b, 13c, 13d and 13e. The oil temperature regulator or cooler 17 is arranged to recondition the oil by cooling, in order that it may be returned to the reservoir at a temperature and viscosity suited for good lubrication. In combat, the oil temperature regulator represents a particularly vulnerable portion of the lubrication system, and when damaged by gunfire allows the oil to drain from the system with consequent eventual engine failure.

According to the present invention, it is contemplated that when that area of the lubrication system which includes the oil temperature regulator is damaged and becomes a source of oil loss, a shut off valve will operate to deny flow to the area, and preferably divert flow through a by-pass.

Describing the arrangement and mode of operation of the system in general terms, as they are diagrammatically indicated in Fig. 1, the oil withdrawn from the engine by pump 16 passes through conduit section 13a to a flow responsive unit comprising a poppet valve 18, such valve being deflected by the flow of fluid thereby a distance proportional to the rate of flow. After passing poppet 18 the oil continues by way of conduit section 13b to a valve assembly 19 controlling the oil flow in such manner as to permit passage to conduit section 13c and oil temperature regulator 17 or to divert flow to a conduit 21 leading to the oil reservoir 11 in by-passing relation to the oil temperature regulator. Normally, the oil flows to the reservoir by way of temperature regulator 17, and, leaving the regulator by way of conduit section 13d, encounters a second poppet valve 22 which it deflects in the manner of valve 18 a distance proportional to the rate of oil flow. After passing poppet valve 22, the oil is directed by conduit section 13e to the reservoir 11.

The poppet valves 18 and 22 have stem portions adapted to engage and compress respective bellows 23 and 24. The bellows 23 and 24 are filled with a hydraulic fluid, and define the ends of separate hydraulic columns, the opposite ends of which are represented by similar bellows 25 and 26. The bellows 23 and 25 are connected by a line 27, while the bellows 24 and 26 are connected by a line 28. Overlying the bellows 25 and 26, which are arranged adjacent one another in side by side relation, is a walking beam 29, including a horizontal base 31 and a vertical arm 32. The vertical arm 32 of the walking beam 29 is provided with a longitudinal slot 33 into which extends a fixed stud 34, acting as a pivot. The opposite ends of base 31 of the walking beam 29 are respectively engaged by the bellows 25 and 26 in such manner that the beam reflects and partakes of motions generated by the poppet valves 18 and 22 and their associated hydraulic columns. Thus, deflection of the poppet valve 18 compresses bellows 23, forcing oil therefrom through line 27 to bellows 25 which is required to expand under the increased fluid flow and so presses upward on one end of the base 31 of the walking beam, tending to rotate the beam in a clockwise direction as viewed in Fig. 1. However, actuation of the poppet valve 18 is accompanied by a similar motion of the poppet valve 22 with a corresponding result on the hydraulic column represented by bellows 24, line 28 and bellows 26. Accordingly, the tendency of bellows 25 to produce a clockwise motion of rotation of the walking beam 29 is counteracted by a similar and opposite action of the bellows 26 tending to produce a counter-clockwise motion of rotation of the beam. If the deflections of the poppet valves 18 and 22 are equal, which they are under conditions of equal flow throughout the system, no rotary motion of the walking beam takes place. It moves simply in a vertical direction upon the stud 34.

In the event a leak develops anywhere in the line between the poppet valve 18 and poppet valve 22, the relative rates of flow past the valves change. That is, the flow past valve 18 will continue to be a function of the speed of operation of pump 16 whereas the deflection of poppet valve 22 will be lessened due to a decreased flow in that portion of the line beyond the place of leakage. An unequal deflection of the poppet valves is immediately reflected in a change in the pressures applied to the walking beam 29, the greater pressure being exerted on the beam through the line associated with valve 18 so that motion of the walking beam in a rotary sense is initiated.

Arm 32 of the walking beam 29 is arranged to contact a switch 35 when turned in a clockwise direction about the pivot 34. The switch 35 is interposed in a circuit comprising a battery 36 from which extend positive and negative leads 37 and 38. The electrical leads 37 and 38 are connected at one end to the switch 35 and at the other end to a solenoid assembly 39 including an electro-magnetically operated valve. As shown, a pilot operated or master switch 39 and a signal light 40 may be incorporated in the electrical system, the latter giving visual indication of a closed circuit. The switch 35 normally is open and the solenoid 39 accordingly de-energized. The solenoid 39 is disposed in a fluid conduit 41, connecting a point of high pressure in the line 13 to the underside of a piston 42 forming part of the valve assembly 19. Normally, pressure from the line 13 is established beneath piston 42 and elevates such piston and a valve 43 to which it is connected, the latter valve controlling flow to conduit section 13c and cooler 17. As will be later described in greater detail, operation of solenoid 39 serves to cut off flow through passage 41 in such manner as to discontinue the application of pressure beneath piston 42 to permit the piston and valve 43 to descend and shut off flow to the oil temperature regulator 17 while permitting flow to the by-pass line 21. Actuation of the solenoid 39 is accomplished by rotary motion in a clockwise direction of the walking beam 29 to close the switch 35.

Inasmuch as the arrangement and disposition of the parts of the lubrication system vary in different types of aircraft, the several elements of the flow loss protection system may be variably combined and positioned. As an illustrative embodiment of the invention, the elements are shown in Figs. 2 to 8 as combined in two separate units. Unit No. 1 comprises the poppet valve 18, valve assembly 19 and solenoid 39, while unit No. 2 comprises poppet valve 22 and the walking beam assembly.

Figure 6:
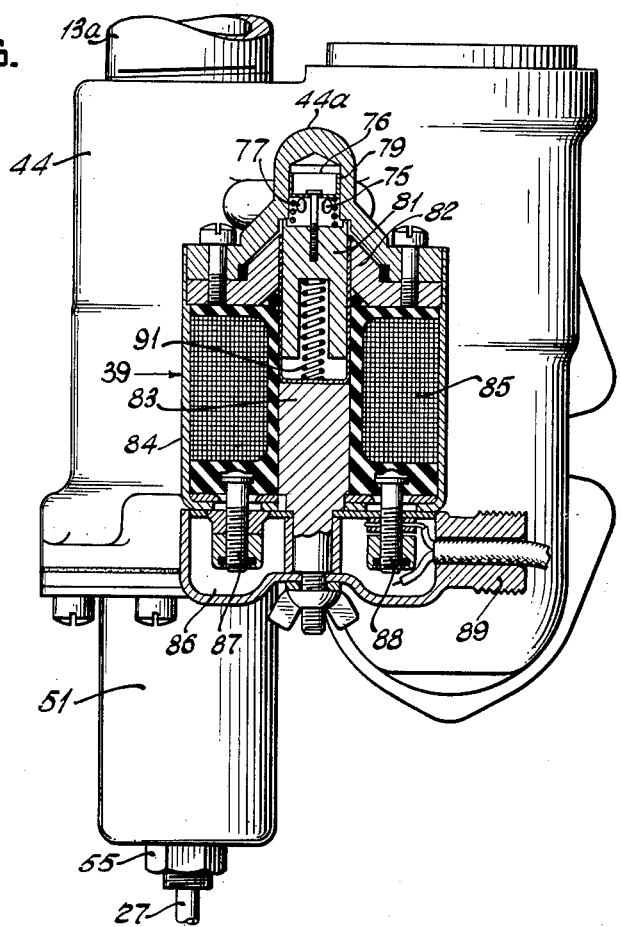
Fig. 6 is a view in vertical longitudinal section of unit 1, being taken substantially along the line 6—6 of Fig. 2 and showing details of a solenoid assembly.

Considering first unit No. 1 and referring to Figs. 6, 7 and 8, this unit comprises a housing 44 provided with an inlet opening 45 receiving the discharge end of conduit section 13a. Within a chamber 46 in the housing 44 and adapted to close the inlet 45 is the poppet valve 18, the stem thereof being slidably mounted in a cylindrical extension of a bushing 47 closing an opening in housing 44 opposite inlet 45. The head of poppet valve 18 is frustoconical in shape so as to provide a sharp circumferential edge for cooperation with the surrounding wall of the housing. Such wall is formed as a tapered area 48 connecting the inlet 45 and chamber 46, the direction of the taper being opposite to the taper of the valve head so that as the poppet valve is lifted the size of the annular area between the circumferential edge of the valve and the surrounding wall of the housing increases. In accordance with this principle of construction, the pressure differential established by the poppet valve is held substantially constant. Any increase or decrease in the flow at inlet 45 is accompanied by a corresponding change in the clearance around the valve. A spring 49 surrounds the stem of poppet valve 18 and presses the valve toward seated position. The stem of poppet valve 18 has secured thereto an extension pin or rod 50 passed through an opening in bushing 47. The pin 50 projects into a space enclosed by a cup like member 51 fastened to the bushing 47 and housing 44 providing a mount for the bellows 23. The bellows 23 is comprised of oppositely disposed end plates 52 and 53, the latter having a screw threaded projection 54 passed through an opening in the cup shaped member 51 and receiving a lock nut 55. Intermediate the end plates 52 and 53, and fastened thereto in a fluidtight manner, is the bellows proper comprising an expansible accordion pleated cylinder of metallic construction. The conduit 27, leading from the bellows 23 extends upward into the bellows through the screw threaded projection 54 thereof. According to the operation of this part of the system, as the pump 16 operates to direct oil toward the reservoir 11 the flow first is discharged against the poppet valve 18, forcing this valve open against the resistance of the relatively light spring 49. Following an initial period of lost motion, the poppet valve 18 moves sufficiently to cause the extension pin 50 thereof to engage plate 52 of bellows 23, whereupon continued opening motion of the poppet valve serves to compress the bellows and expel oil therefrom by way of conduit 27.

Continuing a description of unit No. 1, the oil flowing past poppet valve 18 to chamber 46 passes through an internal port 56 in housing 44 and encounters the valve assembly 19. The port 56 is indicated diagrammatically in Fig. 1 by the conduit section 13b. Following its passage through port 56 the oil has a choice of flow through a port 57 to the main outlet 58 leading to conduit section 13c and oil temperature regulator 17, or through a port 59 leading to a by-pass outlet 61 in communication with by-pass conduit 21. Port 57 is controlled by the valve 43 while port 59 is controlled by a plurality of valves including a main valve 62 and upper and lower blocking valves 63 and 64. The valves controlling the respective ports 57 and 59 surround a shaft 65, the lower end of which is guided in a housing boss 66. The upper end of the shaft 65 extends into a chamber 67 defined by a cage or casing 68 comprised of a cylindrical portion and a lower closure plate. Secured to the shaft 65 within the chamber 67 is the piston 42. Open communication is established between chamber 67 above piston 42 and by-pass outlet 61 by a series of vertical grooves 80 in the unit body outside the cage 68, the upper end of the cage being cut away or notched to permit passage of oil between the piston chamber and the vertical grooves. A closure plate 69 covers the open outer end of chamber 67 and provides a base for a spring 71 which acts on piston 42 in a direction to hold the piston at the lower end of the chamber 67. Valve 43 is loosely mounted on the shaft 65, and is pressed to a seat in port 57 by a spring 72, based on the lower blocking valve 64. Valve 62, controlling by-pass port 59, has an open center portion normally closed by the upper blocking valve 63. A spring 73 based on the casing 68 urges the valve 63 to a seat on main valve 62. A spring 74, heavier than the spring 73, presses the valve 62 to a seat in port 59. Lower blocking valve 64 normally is held spaced from engagement with valve 62, despite the urging of spring 72, by reason of engagement with a shoulder 70 on shaft 65.

The valve assembly described is in itself an element having utility as a surge valve, and, as such, has been in general use prior to this invention. Broadly, a surge type valve is unnecessary to the present invention. A simple two-way or reversing valve may be substituted if surge protection is not required. A detailed description of the manner of operation of the surge valve is therefore considered unnecessary. In general, advantage is taken of pressure differentials on opposite sides of the piston 42 to raise and lower the valve 43, such differentials being established and made variable by the assembly of valves controlling the by-pass port 59. It will be observed that valve 43, controlling the main outlet 58, closes in the direction of fluid flow whereas by-pass control valve 62 closes contrary to fluid flow. Accordingly, when the valve 43 is closed valve 62 may open under pressure and permit flow of the oil to the reservoir 11 by way of by-pass outlet 61 and conduit 21.

In applying fluid pressure to the piston 42, oil is directed to chamber 67 beneath the piston by means of a bore 75 (Fig. 8) in housing 44 registering with an opening of similar diameter in the casing 68. The inlet end of the bore 75 communicates with a chamber 76 at right angles thereto, and defining also the terminus of another bore 77 leading from the inlet 45 in front of poppet valve 18. Accordingly, oil under pressure in inlet 45 may flow by way of bore 77, chamber 76 and bore 75 to piston chamber 67 beneath piston 42. Such pressure is greater than the resistance of spring 71 and so tends to elevate piston 42 and shaft 65. Passed through the shaft 65 at a point normally spaced below the valve 43 is a pin 78. The initial motion of the shaft 65 upward is sufficient to bring the pin 78 into contact with valve 43. Continued upward motion of the shaft 65, as operation of the by-pass valve assembly serves to increase the pressure differential across the piston 42, lifts valve 43 from its seat, allowing oil which heretofore has been constrained to leave the unit by by-pass port 61 to flow through port 57 to the main outlet 58. Valve 43 will remain open when the conditions of flow are normal as long as the engine is continued in operation.

Referring to Fig. 6, in controlling the surge valve mechanism in accordance with the present invention, there is slidably mounted in the bore 76 a piston 79 connected to and forming an extension of a magnetic plunger 81. The plunger 81 is a part of the solenoid 39 the elements of which are secured to an overhanging lateral extension 44a of the housing 44. The solenoid includes, in addition to the plunger 81, a plate 82 secured to the overhanging housing extension 44a and forming a guide way for the plunger 81, inner and outer core members 83 and 84, and an intermediate coil 85. An extension 86 of the cylindrical outer core houses contact members 87 and 88 and is formed with a connector 89 through which electrical leads may be introduced into the assembly. Upon energizing the coil 85 an electro-magnetic action is exerted on the plunger 81, moving the plunger and the piston 79 attached thereto axially inward toward the inner core 83. The end of plunger 81 moves in a counterbore of chamber 76, and is urged by a spring 91 to a position in engagement with the base of said counterbore. As so positioned, the inner end of the plunger 81 and the piston 79 lie on opposite sides of the bores 75 and 77 through which pressure fluid is passed for operation of the piston 68. Accordingly, these bores normally are in constant communication. When the plunger 81 and piston 79 are withdrawn from normal position in response to actuation of the solenoid, the piston 79 moves downward to cover both bores 75 and 77 and thereby deny communication therebetween. The supply of oil under pressure to chamber 67 beneath piston 42 thereby is cut off, and the piston is allowed to descend under the urging of spring 71, the oil beneath the piston being permitted to escape therefrom to the by-pass outlet 61 by way of a small opening 92 in the lower plate comprising casing 68. Descent of the piston 42 permits a lowering of the valve 43 to its seat in port 57, whereupon flow through the main outlet 58 is discontinued and the oil is compelled to follow the by-pass passageway back to the reservoir 11.

Figure 5:
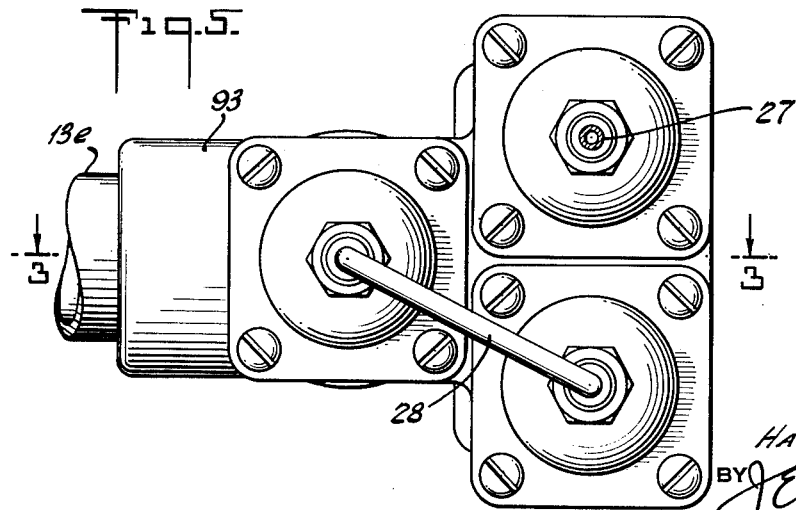
Fig. 5 is a plan view in elevation of unit No. 2.

Unit No. 2 is shown in Figs. 3, 4 and 5, and is seen to be contained in a housing 93 provided with an inlet opening 94 into which extends portion 13d of return conduit 13 leading from the oil cooler 17. Within inlet 94 is a seat for poppet valve 22 which is reciprocable within a chamber 95 communicating with an outlet 96 receiving an end of portion 13e of conduit 13. The poppet valve 22 and its associated parts are similar in all respects to the corresponding elements in unit No. 1. Thus, valve 22 is urged to closed position by a spring 97 and is mounted in a bushing 98 and formed with an extension pin 99 for engagement with the bellows 24.

Since unit No. 2 combines flow valve 22 and its bellows 24 with the walking beam assembly, this unit contains also the bellows 25 and 26 arranged in operative association with the walking beam 29. All the bellows in unit 2 are enclosed in casings similar to the cup shaped casing 51 described in connection with unit 1, and are constructed in a manner the same as bellows 23. Walking beam bellows 26 and 25 are arranged in side by side relation to bellows 24, and are similarly mounted with respect to the housing 93. Integral with or otherwise secured to the free ends of the bellows 25 and 26 are push rods or extension pins 101 and 102 engaged with the horizontal base 31 of the walking beam 29. The upstanding arm 32 of the walking beam is slidably mounted on a screw stud 34, an elongated slot 33 being provided in the arm for that purpose. The screw stud 34 extends into an internal boss of the housing and provides a stationary mount permitting vertical sliding or rotary motion of the walking beam. The arm 32 is formed with a turned over portion 103 lying adjacent to or in contact with a plunger 104 of the switch 35. The switch 35 may be of any conventional type, and is here illustrated as a micro-switch of a well known commercial type wherein only a small amount of motion of the plunger 104 is required to make and break the switch contacts. Electrical connections 105 and 106 are provided on a switch 35 for attachment of the electrical leads which are introduced into the unit by way of a connector 107.

As shown in Fig. 2, units Nos. 1 and 2 are connected by hydraulic line 27 extending from bellows 23 to bellows 25. Since bellows 24 and 26 are in the same unit the interconnecting hydraulic line 28 is of shorter length.

According to the operation of the system, when the engine is idle with no oil flowing through the system, the parts assume the positions illustrated. With regard to valve 43 of unit 1, in the illustrated embodiment of the invention this valve would be closed. In the case of a simple two-way reversing valve, the valve corresponding to valve 43 would be open. In any event, shortly after the engine is started, and flow established through the system, the valve 43 will be open, permitting flow by way of the regular channel through the oil cooler 17. The rate of flow throughout the various portions of return line 13 is the same so that the deflections of poppet valves 18 and 22 are equal. Therefore, the motions transmitted through the respective hydraulic lines 27 and 28 to bellows 25 and 26 are equal and the pressures applied to the opposite ends of base 31 of walking beam 29 are equal. Accordingly, the beam 29 slides upward on stud 34 without effecting operation of switch actuating plunger 104. However, in the event of damage to the oil cooler 17 or to the lines leading to and from the cooler, resulting in leakage, the rate of flow past poppet valve 22 becomes less than the flow past poppet valve 18. The relative deflection of poppet valve 22 decreases, therefore, and the pressure applied to walking beam 29 through bellows 26 becomes less than the pressure applied to the beam through bellows 25. As a consequence, the walking beam moves in a rotary sense about a pivot represented by the stud 34 and in so moving depresses plunger 104 to close an electrical circuit through switch 35 and solenoid 39, it being understood that master switch 30 has been closed as one of the operations conditioning the engine for operation. Operation of the solenoid 39 moves piston 79 (Fig. 6) to a position interrupting communication between bores 75 and 77 to so discontinue the supply of oil under pressure to piston 42 controlling valve 43. This valve accordingly descends and is returned to its seat in port 57 by spring 72. Oil flow to the damaged parts of the system thereby is discontinued, and further fluid loss prevented as the oil by-passes the damaged portion, returning to the oil tank by way of by-pass 21. Signal lamp 40 lights in the pilot's compartment, indicating damage to the system and that the oil is by-passing the cooler.

In actuating the switch plunger 104 it may be said that arm 32 of the walking beam 29 moves from one plane of motion to another.

The switch 35 will remain closed so long as the oil pumps continue in operation, so that flow of oil to the damaged area is prevented as long as operation of the engine is required. It will be observed that the poppet valves 18 and 22 function as check valves preventing a reverse flow of the oil, as may occur following cut-off due to a leak by reason of the pressure head in reservoir 11.

It will be understood that the invention may assume other forms than that here illustrated and described. Particularly are other concepts possible of means for utilizing deflections of poppet valves arranged in series to control a shut-off and by-pass valve.

What is claimed is:

1. Apparatus for detecting fluid loss from a fluid flowing conduit and for discontinuing fluid flow through said conduit, including a valve for shutting off flow through said conduit, actuating means for said valve, first and second independent means movable by fluid flow occupying spaced positions in said conduit and having a deflection proportional to the rate of flow thereby, at least one of said movable means being downstream of said valve, and means utilizing a lesser deflection of one of said movable means relatively to the other to effect operation of said valve actuating means, said valve being normally open and closed by differences in flow of a predetermined amount.

2. Apparatus according to claim 1, characterized in that said movable means consist of normally closed poppet valves moved from closed position by fluid flow a distance proportional to the rate of fluid flow.

3. Apparatus for detecting fluid loss from a fluid flowing conduit and for discontinuing fluid flow through said conduit, including a valve for shutting off flow through said conduit, first and second independent means movable by fluid flow occupying spaced positions in series in said conduit and having a deflection proportional to the rate of flow thereby, at least one of said movable means being downstream of said valve, a control part having motion in first and second senses, means for transmitting the movement of said first and second movable means to said control part, an equal deflection of said movable means serving to impart motion in a first sense to said control part and a lesser deflection of said second means relative to said first means serving to impart motion in a second sense to said part, and means utilizing motion of said control part in said second sense to actuate said valve, said valve being normally open and closed by differences in flow of a predetermined amount.

4. Apparatus for detecting fluid loss from a fluid flowing conduit and for discontinuing fluid flow therethrough, including a valve for shutting off flow through said conduit, control means for said valve, first and second independent means movable by fluid flow occupying spaced positions in series in said conduit and having a deflection proportional to the rate of flow thereby, at least one of said movable means being downstream of said valve, a control part having a portion movable from a first to a second plane to operate said control means, said valve being normally open and closed by differences in flow of a predetermined amount, and means for transmitting the motion of said movable means to said control part without shifting the plane of said portion when the deflections of said movable means are equal and to move said portion to said second plane when the deflection of said second movable means is less than that of said first movable means.

5. Apparatus for detecting fluid loss from a fluid flowing conduit and for discontinuing fluid flow therethrough, including a valve for shutting off flow through said conduit, actuating means for said valve, independent flow responsive devices arranged in series in said conduit, each of said flow responsive devices having a part deflectable in accordance with the rate of flow thereby, at least one of said devices being downstream of said valve, control means for effecting operation of said valve actuating means, said valve being normally open and closed by differences in flow of a predetermined amount, and motion transmitting means between the deflectable parts of said flow responsive devices and said control means, said transmitting means including a portion having motion from one plane to another to actuate said control means in response to a lesser deflection of a part in one flow responsive device as compared to the deflection of the corresponding part in a flow responsive device upstream thereof.

6. Fluid loss protection apparatus for use in a fluid flowing system, comprising a pair of independent fluid flow responsive poppet valves arranged in series in said system to define a protected area therebetween, said poppet valves being deflected by the flow of fluid thereby in accordance with the rate of such flow, a valve upstream of said protected area and at least one of said poppet valves for shutting off flow to said protected area, said valve being normally open and closed by differences in flow of a predetermined amount, operating means for said valve, and means responsive to the relative deflections of said poppet valves and for utilizing a lesser deflection of the second of said pair of valves to effect operation of said valve operating means.

7. Fluid loss protection apparatus according to claim 6, characterized in that said last named means includes a walking beam having motion in response to deflection of the poppet valves in one plane when the poppet valve deflection is equal and movable to another plane of motion when the deflection of the poppet valves is unequal, and further includes a control for said valve operating means actuated by said walking beam in moving from one plane to another.

8. Fluid loss protection apparatus for use in a fluid flowing system, comprising a pair of independent fluid flow responsive poppet valves arranged in series in said system to define a protected area therebetween, said poppet valves being deflected by the flow of fluid thereby in accordance with the rate of such flow, a valve upstream of said protected area and at least one of said poppet valves for shutting off flow to the protected area, said valve being normally open and closed by differences in flow of a predetermined amount, including means normally tending during operation of the system to hold said valve open, means for disabling said last named means and for closing said valve, including a control part movable to effect closure of the valve, and actuating means for said control part operated by said poppet valves, said actuating means including an actuating portion movable from one plane of movement to another in response to a lesser deflection of the second of said pair of poppet valves.

9. Apparatus responsive to the difference in the rates of flow at spaced points in a fluid flowing conduit, comprising first and second independent means movable by fluid flow occupying spaced positions in series in said conduit and having a deflection proportional to the rate of flow thereby, a movable part having motion in first and second senses, and independent means for transmitting the movement of said first and second movable means to said part in a manner to effect motion thereof in said second sense but respectively opposed, an equal deflection of said movable means serving to impart motion in a first sense to said part and a lesser deflection of said second means relative to said first means serving to impart motion in a second sense to said part.

10. Apparatus according to claim 9 characterized by fluid flow control means constructed and arranged in cooperative relation with said movable part upstream of at least one of said movable means for operation by said part during motion thereof in said second sense.

11. Apparatus responsive to the difference in the rates of flow at spaced points in a fluid flowing conduit, comprising first and second independent means movable by fluid flow occupying spaced positions in series in said conduit and having a deflection proportional to the rate of flow thereby, a movable fluid flow control part having a portion movable from a first to a second plane to initiate a control operation, and means for transmitting the motion of said movable means to said control part without shifting the plane of said portion when the deflections of said movable means are equal and to move said portion to said second plane when the deflection of said second movable means is less than that of said first movable means.

12. Apparatus responsive to the difference in the rates of flow at spaced points in a fluid flowing conduit, comprising a pair of independent poppet valves arranged in series in said conduit for deflection by the flow of fluid thereby in accordance with the rate of such flow, independent actuating means operable by said poppet valves, a walking beam mounted for motion in first and second senses and arranged in cooperative relation with said actuating means in such wise as to be movable in the first said sense in response to an equal deflection of said poppet valves and to be movable in the second said sense in response to a lesser deflection of the second of said pair of poppet valves relative to the first of said pair of valves, and a part movable by said walking beam during motion thereof in the second said sense.

13. Apparatus for detecting fluid loss from a fluid flowing system, including a valve for shutting off flow through said conduit and means for actuating said valve, said valve being normally open and closed by differences in flow of a predetermined amount; characterized by first and second independent devices movable by fluid flow occupying spaced positions in series relation in said conduit and each having a deflection proportional to the rate of flow thereby, at least one of said devices occupying a position downstream of valve, a control part having motion in first and second senses in the latter of which it effects operation of said valve actuating means, and motion transmitting means resolving an equal deflection of said devices into a movement of said control part in said first sense and an unequal deflection of said devices into a motion of said control part in said second sense.

14. Apparatus for detecting fluid loss from a fluid flowing conduit including a valve for shutting off flow through said conduit and means for actuating said valve, said valve being normally open and closed by differences in flow of a predetermined amount; characterized by first and second independent devices movable by fluid flow occupying spaced positions in series relation in said conduit and each having a deflection proportional to the rate of flow thereby, at least one of said devices occupying a position downstream of said valve, a control part having motion in first and second senses in the latter of which it effects operation of said valve actuating means, a connection between said first device and said part to move said part in said second sense under the deflection of said first device, and a connection between said second device and said part to oppose motion of said part, said part having motion in said first sense in response to an equal deflection of said devices and having motion in said second sense in response to a deflection of said second device which is less than that of said first device.

15. Apparatus for detecting fluid loss from a fluid flowing conduit, including a valve for shutting off flow through said conduit and means for actuating said valve, said valve being normally open and closed by differences in flow of a predetermined amount; characterized by first and second independent devices movable by fluid flow occupying spaced positions in series relation in said conduit and each having a deflection proportional to the rate of flow thereby, at least one of said devices occupying a position downstream of said valve, a control part movable to effect operation of said valve actuating means, a connection between said first device and said control part to move said part under deflection of said first device, and a connection between said second device and said part to oppose movement of said part by said first device, equal deflection of the movable devices producing equal and opposed impulses upon said control part.

HARRY T. BOOTH.

References Cited in the file of this patent

UNITED STATES PATENTS

| Number | Name | Date |
| --- | --- | --- |
| 1,052,172 | Rateau | Feb. 4, 1913 |
| 1,407,060 | Graemiger | Feb. 21, 1922 |
| 1,847,086 | Gargan | Mar. 1, 1932 |
| 2,012,351 | Riney | Aug. 27, 1935 |
| 2,084,368 | Wynn | June 22, 1937 |
| 2,257,577 | Rosenberger | Sept. 30, 1941 |
| 2,311,069 | Miller | Feb. 16, 1943 |
| 2,404,936 | Wills | July 30, 1946 |
| 2,512,189 | Waterman | June 20, 1950 |

FOREIGN PATENTS

| Number | Country | Date |
| --- | --- | --- |
| 669,897 | France | of 1929 |